(12) United States Patent  
Fukuda et al.

(10) Patent No.: US 9,153,866 B2  
(45) Date of Patent: Oct. 6, 2015

(54) COMMUNICATION MEDIUM

(75) Inventors: Hiroshi Fukuda, Tokyo (JP); Naoki Kobayashi, Tokyo (JP); Tsuneo Tsukagoshi, Tokyo (JP)

(73) Assignee: NEC Corporation, Tokyo (JP)

( * ) Notice: Subject to any disclaimer, the term of this patent is extended or adjusted under 35 U.S.C. 154(b) by 209 days.

(21) Appl. No.: 13/884,113

(22) PCT Filed: Nov. 7, 2011

(86) PCT No.: PCT/JP2011/075561
§ 371 (c)(1),
(2), (4) Date: May 8, 2013

(87) PCT Pub. No.: WO2012/066953
PCT Pub. Date: May 24, 2012

(65) Prior Publication Data
US 2013/0222203 A1 Aug. 29, 2013

(30) Foreign Application Priority Data
Nov. 19, 2010 (JP) ................................. 2010-258727

(51) Int. Cl.
*H01Q 1/52* (2006.01)
*H04B 13/00* (2006.01)

(52) U.S. Cl.
CPC ............... *H01Q 1/526* (2013.01); *H04B 13/00* (2013.01)

(58) Field of Classification Search
USPC .......................................... 343/700 MS, 841
See application file for complete search history.

(56) References Cited

U.S. PATENT DOCUMENTS 5,733,511 A * 3/1998 De Francesco .......... 422/186.05

FOREIGN PATENT DOCUMENTS

| CN | 1369929 A | 9/2002 |
|---|---|---|
| JP | 2007-281678 A | 10/2007 |
| JP | 2008-53337 A | 3/2008 |
| JP | 4538594 B2 | 9/2010 |
| WO | WO 2007/032049 A1 | 3/2007 |

OTHER PUBLICATIONS

Office Action mailed Apr. 24, 2014 in related Chinese application No. 201180054956.4 with English-language translation (12 pgs.).
H. Fukuda et al., Reducing Radiated Emissions from Ends of a Two-Dimensional Signal Transmission Sheet, The Institute of Electronics, Information and Communication Engineers Sogo Taikai Koen Ronbunshu, Mar. 2, 2010, p. 140.

(Continued)

*Primary Examiner* — Tan Ho
(74) *Attorney, Agent, or Firm* — Foley & Lardner LLP

(57) ABSTRACT

A communication medium includes: a first sheet conductor portion; a second sheet conductor portion that is arranged facing the first sheet conductor portion; and a conductor portion that surrounds an end part of the first sheet conductor portion and an end part of the second sheet conductor portion. The second sheet conductor portion includes: a shield part that has no opening part; a communication power feed part that has opening parts; and a matched line part that is provided between the shield part and the communication power feed part, and impedance of which matches with the shield part and the communication power feed part. The conductor portion surrounds the end part of the shield part.

3 Claims, 5 Drawing Sheets

(56) References Cited

OTHER PUBLICATIONS

Aratana Tsushin Baitai o Riyo shita Surface Tsushin Gijutsu no Kenkyu Kaihatsu (137), [Seika Gaiyo] Seika Image-zu, Heisei 21 Nendo Kenkyu Seika Gaiyo, National Institute of Information and Communications Technology (NICT), May 19, 2010, 8 pages.

Naoki Kobayashi et aol, Challenging EMC Problems on Two-Dimensional Communication Systems, Seventh International Conference on Networked Sensing Systems (INSS), Jun. 15, 2010, pp. 130-137.

Hiroyuki Shinoda, High Speed Sensor Network Formed on Material Surface, Journal of the Society of Instrument and Control Engineers, vol. 46, No. 2, Feb. 2007, pp. 98-103.

International Search Report, PCT/JP2011/075561, Dec. 6, 2011, 5 pages.

Lim, A. O. et al. "Evaluation of Electromagnetic Field Measurement over Two-Dimensional Communication Media with Anti-Reflection Edged." The Institute of Electronics, Information Communication Engineers, IEICE Technical Report MW2008-82, Aug. 21, 2008.

Office Action mailed Jul. 21, 2015 in related Japanese Appl. No. 2012-544179 with partial English language translation (5 pgs.).

* cited by examiner

COMMUNICATION MEDIUM

TECHNICAL HEED

The present invention relates to a communication medium.

BACKGROUND ART

There has been proposed two-dimensional communication in which communication and power supply are carried out using a sheet-shaped antenna. In this sheet-shaped antenna, for example, two sheet conductor portions are arranged so as to face each other and dielectric is filled therebetween as with the signal transmission systems disclosed in Patent Documents 1 and 2. A portion of one of the sheet conductor portions except the edge thereof forms a grid composed of a conductor. By connecting a dedicated coupler for transmitting and receiving electromagnetic waves, communication and electric power supply are realized. The characteristics of electromagnetic waves that propagate through the sheet conductor portion are characterized by the sheet impedance.

PRIOR ART DOCUMENTS

Patent Documents

[Patent Document 1] Unexamined Japanese Patent Application, First Publication No. 2007-281678

[Patent Document 2] Japanese Patent Publication No. 4538594

Non-Patent Documents

[Non-Patent Document 1] Hiroyuki Shinoda, "High Speed Sensor Network Formed on Material Surfaces," Journal of the Society of Instrument and Control Engineers, The Society of Instrument and Control Engineers, Feb. 1, 2007, Vol. 46, No. 2, pp. 98-103.

SUMMARY OF THE INVENTION

Problem to be Solved by the Invention

However, in the signal transmission systems disclosed in Patent Documents 1 and 2, a dielectric is placed on the end part, and therefore, electric field intensity is not always minimized. As a result, there has been a problem in that electromagnetic waves leak from the end part of this signal transmission system.

The present invention has been achieved, taking the above points into consideration. An exemplary object of the present invention is to provide a communication medium capable of suppressing electromagnetic wave leakage.

Means for Solving the Problem

The present invention has been achieved to solve the above problem, and a communication medium according to the present invention includes: a first sheet conductor portion; a second sheet conductor portion that is arranged facing the first sheet conductor portion; and a conductor portion that surrounds an end part of the first sheet conductor portion and an end part of the second sheet conductor portion. The second sheet conductor portion includes: a shield part that has no opening part; a communication power feed part that has opening parts; and a matched line part that is provided between the shield part and the communication power feed part, and impedance of which matches with the shield part and the communication power feed part. The conductor portion surrounds the end part of the shield part.

Effect of the Invention

According to the present invention, electromagnetic wave leakage can be suppressed.

EMBODIMENTS FOR CARRYING OUT THE INVENTION (First Exemplary Embodiment)

Hereunder, exemplary embodiments of the present invention are described, with reference to the drawings.

Figure 1A:
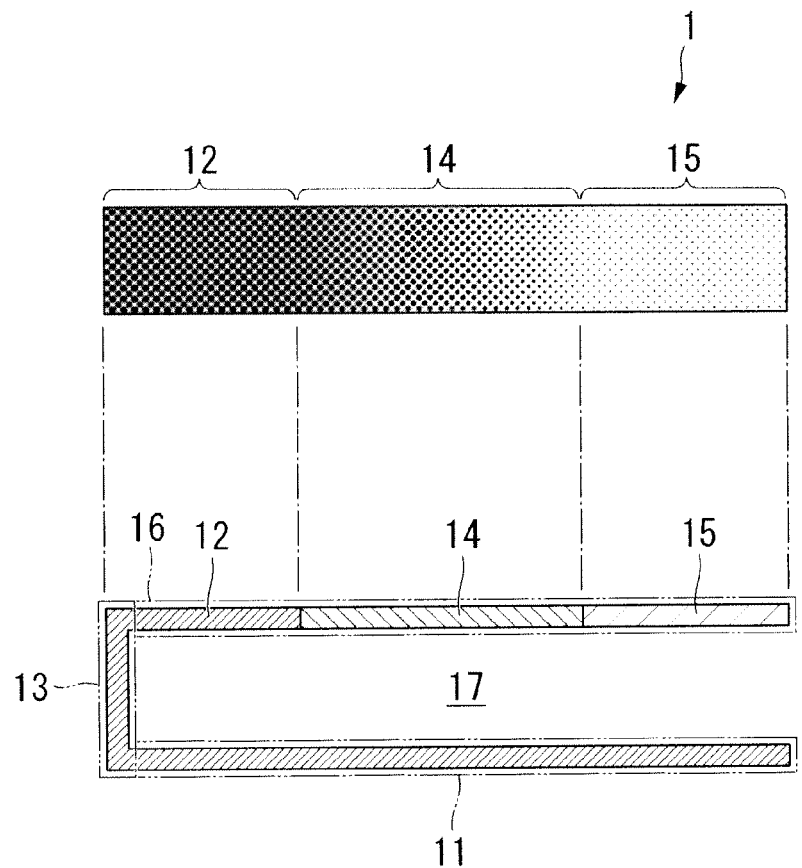
FIG. 1A is a schematic diagram showing a communication medium according to a first exemplary embodiment of the present invention.

FIG. 1A is a schematic diagram showing a communication medium 1 according to the present exemplary embodiment. The upper part of FIG. 1A is a conceptual diagram showing, in a grey scale, the value of sheet impedance in a second conductor sheet 16 (this conceptual diagram is described in detail later). The lower part of FIG. IA is a sectional view showing the communication medium 1 according to the present exemplary embodiment. The communication medium 1 includes a first conductor sheet (sheet conductor portion) 11, a metal wall (conductor portion) 13, a second conductor sheet (sheet conductor portion) 16, and a dielectric 17. The second conductor sheet 16 includes a shield plane 12, a variable mesh part (matched line part) 14, and a communication-power feed plane (communication power feed part) 15. The shield plane 12, the variable mesh part 14, and the communication-power feed plane 15 are flush with one another. The first conductor sheet 11 and the second conductor sheet are arranged in parallel with each other while facing each other.

The first conductor sheet 11 is composed, for example, of a metal layer, and it has no opening part such as a grid.

The shield plane 12 is composed, for example, of a metal layer as with the first conductor sheet 11 and it has no opening part. The material of the shield plane 12 may be the same conductor as that of the first conductor sheet 11.

The metal wall 13 is composed of a conductor (metal) that seals the entire of the end parts of the first conductor sheet 11 and the second conductor sheet 16 (shield plane 12) (in the figure of the lower part of FIG. 1A, only the left side portion of the end parts is shown).

Between both of the conductor sheets 11 and 16, there is filled a dielectric 17. The dielectric 17 may be, for example, a gas (for example, air) or a formed synthetic resin that contains gas. By making the electric field intensity at the end parts of the conductor sheets 11 and 16 a minimum, leakage of electromagnetic waves can be suppressed. In the communication medium 1, at the end part of the conductor sheet 16, there are provided the shield plane 12 and the metal wall 13. With this configuration, the electric field intensity in the periphery of the end part of the conductor sheet 16 is minimized. As a result, even in a case where electromagnetic waves propagating within both of the conductor sheets 11 and 16 are reflected by the metal wall 13, electromagnetic wave leakage is suppressed.

The metal wall 13 may have a via structure. The metal wall 13 may be the same conductor as the material of the first conductor sheet 11 and the shield plane 12.

The communication-power feed plane 15 is composed of a conductor that is formed in a grid shape (that has spatially periodic opening parts). The communication-power feed plane 15 is arranged at a position in the second conductor sheet 16 that is distanced from the shield plane 12 (on the right hand side in the example of the figure of the lower part of FIG. 1A). On the communication-power feed plane 15, there is bonded a coupler. To the communication-power feed plane 15, there are supplied electromagnetic waves to be transmitted from the outside of the communication medium 1 through the coupler. The grid interval and the conductor width of the conductor that forms the communication-power feed plane 15 are constant. As a result, the sheet impedance of the communication-power feed plane 15 becomes constant.

The sheet impedance of the communication-power feed plane 15 becomes higher than the sheet impedance of the shield plane 12, which has no opening part.

The variable mesh part 14 is a conductor that is formed in a grid shape and is arranged between the shield plane 12 and the communication-power feed plane 15. The conductor width of the conductor that constitutes the variable mesh part 14 is designed so that the sheet impedance of the variable mesh part 14 changes spatially continuously, that is, for example, it changes exponentially with respect to the distance from the portion in contact with the shield plane 12. The sheet impedance of the portion of the variable mesh part 14 in contact with the shield plane 12 is equal to the sheet impedance of the shield plane 12. Moreover, the sheet impedance of the portion of the variable mesh part 14 in contact with the communication-power feed plane 15 is equal to the sheet impedance of the communication-power feed plane 15. The relationship between sheet impedance and conductor width is described later. As described above, the configuration for changing sheet impedance is not limited to changing conductor width. In order to change sheet impedance, the grid interval, or the conductor width and the grid interval of the conductor that constitutes the variable mesh part 14 may be changed.

Figure 1B:
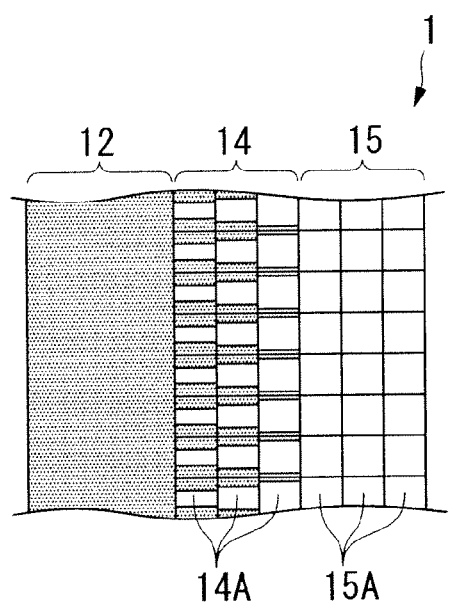
FIG. 1B is an example of a plan view of a second conductor sheet of the communication medium shown in FIG. IA.

The diagram of the upper part of FIG. 1A is a conceptual diagram showing that the sheet impedance of the second conductor sheet 16 becomes lower as the color becomes deeper. That is to say, the diagram of the upper part of FIG. 1 shows that the sheet impedance of the second conductor sheet 16 becomes lower with approach to the shield plane 12, and that the sheet impedance of the second conductor sheet 16 becomes higher with approach to the communication-power feed plane 15. The distance from the portion of the second conductor sheet 16 in contact with the shield plane 12 to the portion in contact with the communication-power feed plane 15 is referred to as variable region width L When the impedance is set to change exponentially with respect to the distance, this variable region width L is set to half the effective wavelength of the electromagnetic wave that propagates between both of the conductor sheets 11 and 16 (half wavelength). With this configuration, the sheet impedance is matched between the shield plane 12 and the communication-power feed plane 15, and the variable mesh part 14 acts as a matched line between the shield plane 12 and the communication-power feed plane 15. That is to say, electromagnetic waves propagate without being reflected, between the shield plane 12 and the communication-power feed plane 15. FIG. 1B is an example of a plan view of the second conductor sheet 16. As shown in FIG. 1B, no opening part is provided in the shield plane 12. In the variable mesh part 14, there are provided opening parts 14A. In the communication-power feed plane 15, there are provided opening parts 15A.

In order for the variable mesh part 14 to act as a matched line, the sheet impedance $Z(x)$ of the variable mesh part 14 may be defined so that the reflection coefficient becomes $\Gamma=0$. The reflection coefficient F is given as in the following formula (1).

[Formula 1]

$$\Gamma = \frac{1}{2}\int_0^L e^{-2j\beta x} \frac{d}{dx}(\ln Z(x))dx = 0 \tag{1}$$

Here, x denotes the value of the x coordinate. In this x coordinate system, the value of the x coordinate at the boundary point between the variable mesh part 14 and the communication-power feed plane 15 is defined as zero. The direction from this boundary point toward the shield plane 12 (left-horizontal direction in the diagram of the lower part of FIG. 1A) is defined as the positive direction of the x axis at the x coordinate. The variable region width L shows the value of the x coordinate at the boundary point between the variable mesh part 14 and the shield plane 12, that is, the width of the variable mesh part 14 (variable region width). $\beta$ denotes a phase constant.

Sheet impedance is a ratio between the electric field and the magnetic field of an electromagnetic wave that propagates within two conductor sheets. When considering an electromagnetic wave propagating within the communication-power feed plane 15 of the present exemplary embodiment, the sheet impedance Z is given as in the following formula (2), provided that the sheet impedance is averaged to a constant value with consideration of the order of the mesh structure being sufficiently smaller than the wavelength order of the electromagnetic wave that is propagating.

[Formula 2]

$$Z = \mu_0 h \omega \left(\frac{1}{\varepsilon_r} \cdot \frac{c_0^2}{c^2} - 1\right) \tag{2}$$

Here, h denotes the thickness of an insulation layer sandwiched between the sheets, $\varepsilon_r$ denotes relative permittivity, $\mu_0$ denotes magnetic permeability, c denotes light velocity in the insulation layer, $c_0$ denotes light speed in a vacuum, and $\omega$ denotes angular frequency. At this time, the phase constant β is give as in the following formula (3) where effective wavelength is denoted as λ.

[Formula 3]

$$\beta = \frac{2\pi}{\lambda} = \frac{\omega}{c} \qquad (3)$$

Since the opening parts of the communication-power feed plane 15 are sufficiently smaller than the wavelength order of electromagnetic waves, the amount of electromagnetic wave leakage to the outside of the sheet from the surface is minute. However, a communication medium in reality has a finite size and it therefore has an end part. As a result, discontinuity of impedance at this end part causes electromagnetic wave leakage to occur. In order to avoid electromagnetic wave leakage caused by the difference in impedance between the communication-power feed plane 15 and another portion, how the sheet impedance of a conductor sheet is determined is important. Sheet impedance changes according generally to the ratio of a conductor portion region size. For example, in the case where the conductor portion is of a grid shape (mesh structure) as shown in FIG. 2, sheet impedance can be defined by adjusting the width of the conductor portion that extends in the waveguide direction x (hereunder, referred to as conductor width).

Figure 2:
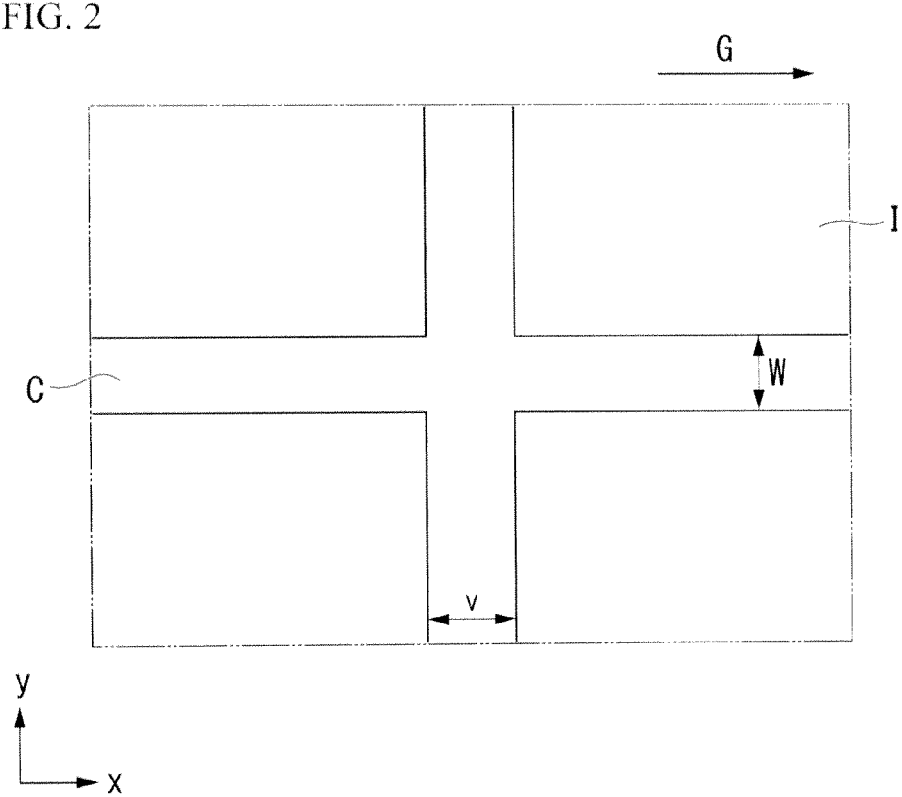
FIG. 2 is a configuration example of a conductor portion of the second conductor sheet of the communication medium shown in FIG. 1A.

FIG. 2 is a schematic diagram showing a configuration example of the conductor portion in a conductor sheet. FIG. 2 shows a conductor part C of the conductor sheet 11, an insulator part I, and a waveguide direction G. The width v of the portion of the conductor part C that extends in the y direction is 1 mm.

Figure 3:
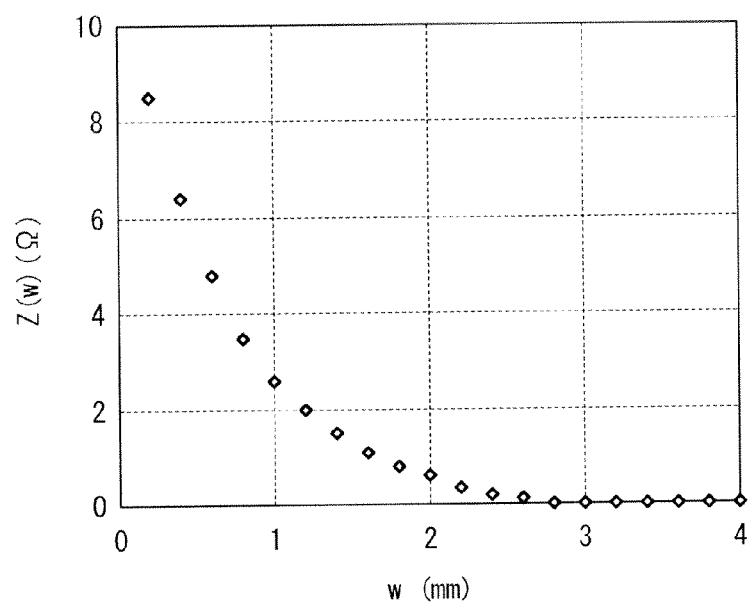
FIG. 3 is a diagram showing an example of a relationship between conductor width and impedance in the first exemplary embodiment of the present invention.

As an example, there is described a case where the mesh interval, which is the distance between the conductors adjacent to each other, is 4 mm, the thickness of the insulation layer is 1 mm, and the relative permittivity of the dielectric is 2.3. In this case, the sheet impedance Z (w) for each conductor width w takes the value shown in FIG. 3. FIG. 3 is a diagram showing an example of the relationship between conductor width and impedance.

In FIG. 3, the horizontal axis represents conductor width w, and the vertical axis represents sheet impedance Z (w). FIG. 3 shows that the sheet impedance Z (w) drastically decreases as the conductor width w becomes greater.

Figure 4:
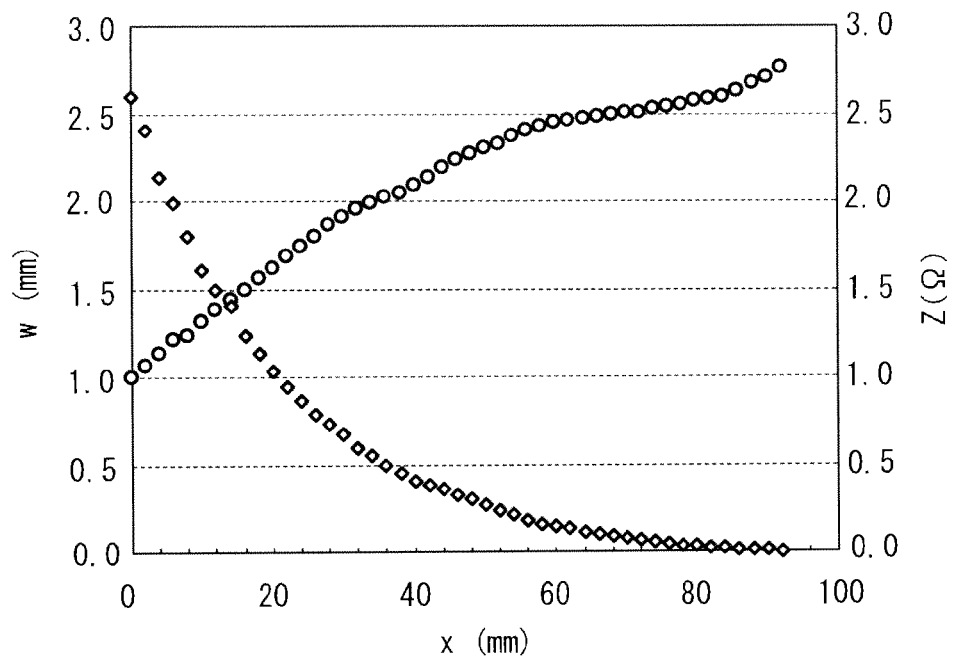
FIG. 4 is a diagram showing an example of a relationship between conductor width and sheet impedance, and coordinate value in the first exemplary embodiment of the present invention.

The variable region width L of the variable mesh part 14 is set to a length half the effective wavelength λ. Moreover, the conductor width w of the variable mesh part 14 changes according to the relationship shown in FIG. 3 so that the sheet impedance Z (w) changes exponentially in the waveguide direction G. The relationship between the coordinate value x, and the conductor width w (x) and the sheet impedance Z (x) is shown in FIG. 4. FIG. 4 is a diagram showing an example of the relationship between the conductor width w (x) and the sheet impedance Z (x), and the coordinate value x. The horizontal axis of FIG. 4 is the coordinate value x. The vertical axis of FIG. 4 represents conductor width w (x) or sheet impedance Z (x). In FIG. 4, rhombic marks are used to represent the sheet impedance Z (x), and circular marks are used to represent the conductor width w (x). According to FIG. 4, the sheet impedance Z (x) decreases exponentially so as to follow the increase of x. On the other hand, the conductor width w (x) increases monotonically so as to follow the increase of x. In this manner, the sheet impedance in the variable mesh part 14 can be quantitatively determined by changing the conductor width w (x).

In the above description, there has been described the example of changing the sheet impedance by changing the conductor width w (x) of the variable mesh part 14. However, it is not limited to this The sheet impedance may be changed by spatially continuously changing the grid interval, or the conductor width and the grid interval. By providing this type of configuration, the portion with discontinuous impedance is substantially eliminated and electromagnetic wave leakage from the communication medium 1 can be suppressed.

Figure 5:
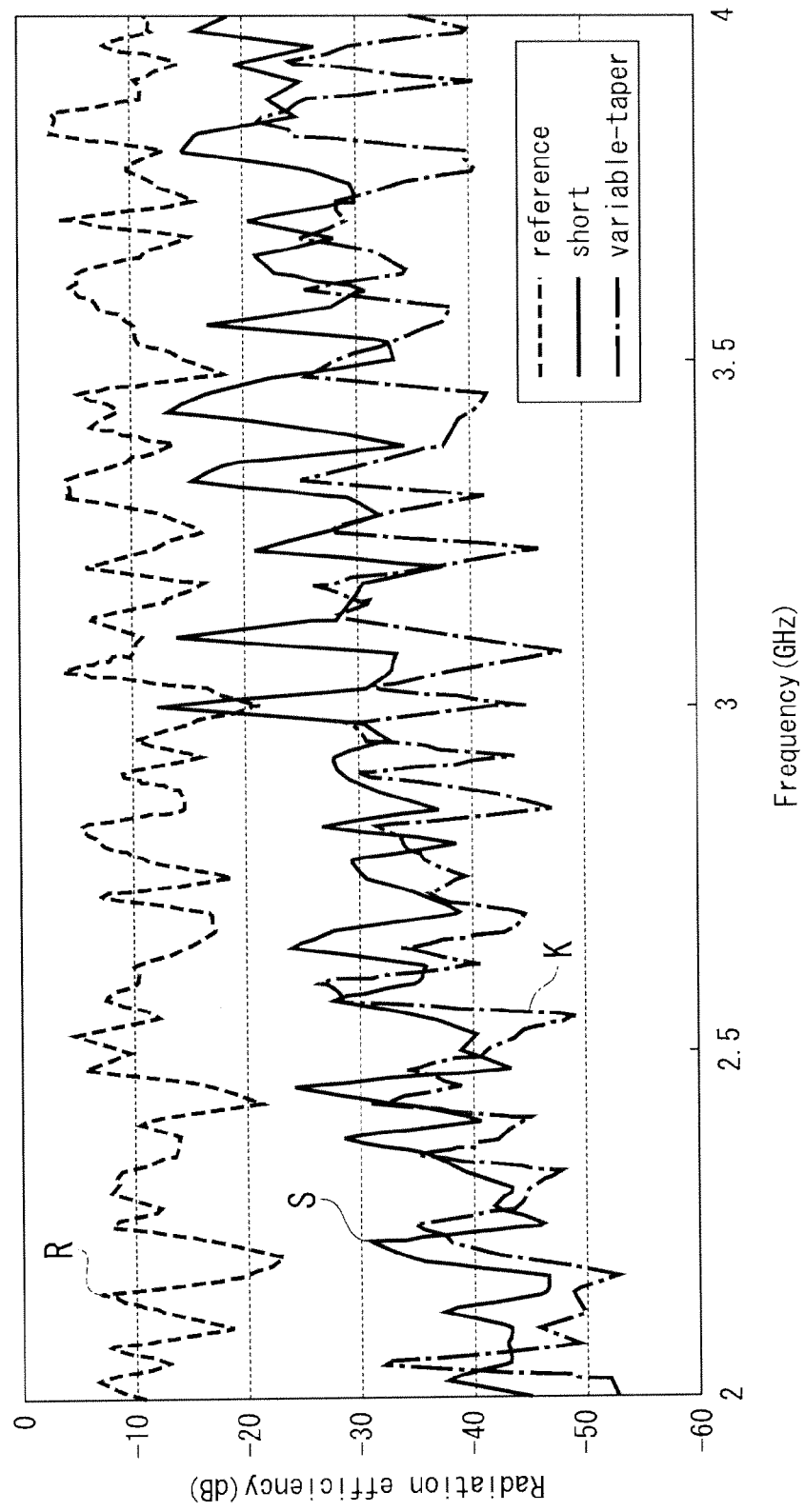
FIG. 5 is a diagram showing an example of frequency characteristics of radiation efficiency of electromagnetic waves in the first exemplary embodiment of the present invention.

The effect of electromagnetic wave leakage from the communication medium 1 in the present exemplary embodiment will be described. FIG. 5 is a diagram showing the result of verifying, with use of an electromagnetic field simulator, an example of the electromagnetic wave leakage amount, that is, the frequency characteristic of radiation efficiency. The vertical axis of FIG. 5 represents radiation efficiency. The horizontal axis of FIG. 5 represents frequency of electromagnetic waves. The broken line R (the line with the note "reference") represents the radiation efficiency about a communication medium that is configured in a manner such that the metal wall 13 and the variable mesh part 14 are removed from the configuration of the communication medium 1 of the present exemplary embodiment, and the shield plane 12 and the communication-power feed plane 15 are in direct contact with each other (hereunder, referred to as reference medium). The solid line S (the line with the note "short") represents the radiation efficiency about a communication medium that is configured in a manner such that the variable mesh part 14 is removed from the communication medium 1 of the present exemplary embodiment, and the shield plane 12 and the communication-power feed plane 15 are in direct contact with each other (hereunder, referred to as medium with metal wall). The dashed line K (the line with the note "variable-taper" represents the radiation efficiency about the communication medium 1 of the present exemplary embodiment.

Provided that, each of the communication media is of a square shape, and the length of the respective edges is 40 cm. Furthermore, the shield plane 12 takes a width of 8 mm from the end part. As can be understood clearly from FIG. 5, the radiation efficiency, that is, electromagnetic wave leakage, in the case of using the communication medium 1 is the lowest at least between frequencies 2 GHz and 4 GHz. The radiation efficiency in the case of using the reference medium takes values approximately −10 dB regardless of the frequencies. The reference medium has the largest amount of electromagnetic wave leakage. The radiation efficiency in the case of using the medium with a metal wall increases approximately from −40 dB to −20 dB, as the frequency increases from 2 GHz to 4 GHz. The medium with the metal wall has the second largest amount of electromagnetic wave leakage. In contrast to these, the radiation efficiency in the case of using the communication medium 1 according to the present exemplary embodiment increases approximately from −50 dB to −30 dB as the frequency becomes higher from 2 GHz to 4 GHz.

As described above, according to the present exemplary embodiment, the second conductor sheet 16 includes the shield plane 12 that has no opening part, the communication-power feed plane 15 that has opening parts, and the matched line part 14 which is provided between the shield plane 12 and the communication-power feed plane 15, and the impedance of which is matched with that of the shield plane 12 and the communication-power feed plane 15. The communication medium 1 includes the metal wall 13 that surrounds the end part of the first conductor sheet 11 and the end part of the shield plane 12 (that is, a part of the conductor sheet 16, which is a part of the shield plane 12). With this configuration, the electric field at and in the vicinity of the end part of the second conductor sheet 16 is minimized, and electromagnetic wave leakage is suppressed.

(Second Exemplary Embodiment)

Hereunder, a second exemplary embodiment of the present invention is described, with reference to the drawings.

Figure 6:
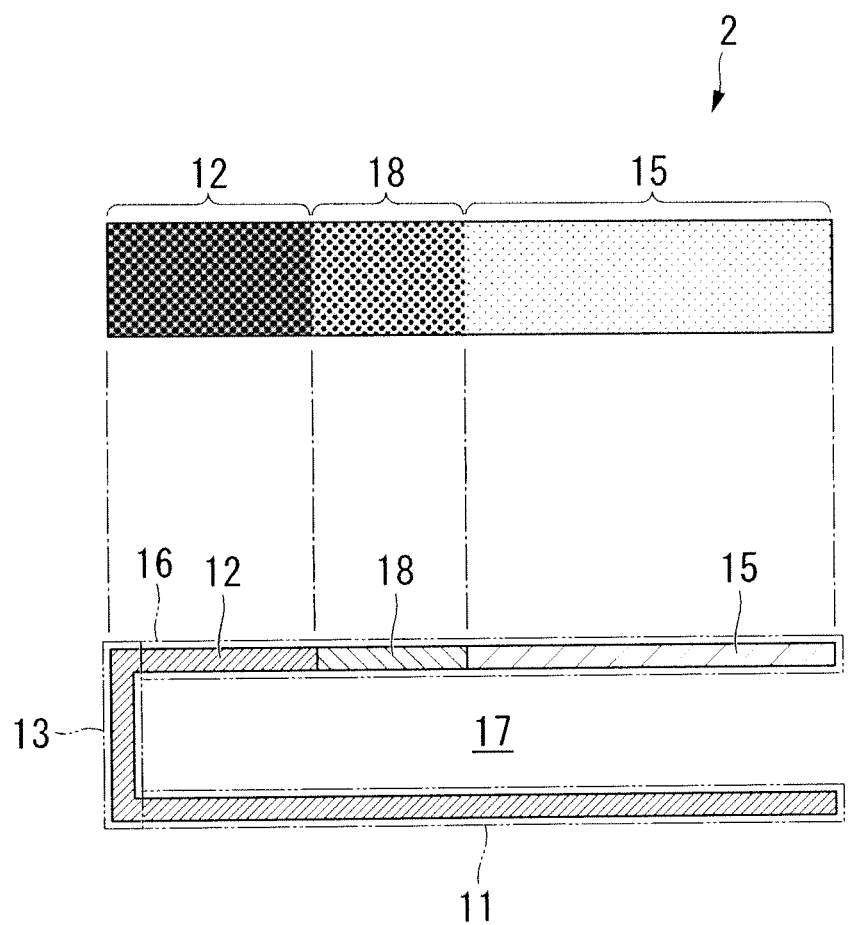
FIG. 6 is a schematic diagram showing a configuration of a communication medium according to a second exemplary embodiment of the present invention.

FIG. 6 is a schematic diagram showing a configuration of a communication medium 2 according to the second exemplary embodiment of the present invention. The upper part of FIG. 6 is a conceptual diagram showing, in a grey scale, the sheet impedance value in the second conductor sheet 16. The lower part of FIG. 6 is a sectional view showing the communication medium 2 according to the present exemplary embodiment. The communication medium 2 has an arrangement of constituent members similar to that of the communication medium 1. However, the communication medium 2 differs from the communication medium 1 in that it has a matched line part 18 that is a ¼ wavelength line, instead of the variable mesh part 14 in the communication medium 1.

The width of the matched line part 18 in the x direction (the horizontally left direction of the lower part of FIG. 6) is ¼ of the effective wavelength λ (¼ wavelength). Moreover, as shown in the following formula (4), the sheet impedance Z. of the matched line part 18 is a geometric mean of the sheet impedance $Z_t$ of the communication-power feed plane 15 and the sheet impedance $Z_s$ of the shield plane 12, that is, the square root of the product thereof. As shown in the diagram of the upper part of FIG. 6, the value of the sheet impedance $Z_m$ of the matched line part 18 is a constant value.

Formula 4

$$Z_m = \sqrt{Z_t Z_s} \quad (4)$$

At this time, the impedance of the system composed of the matched line part 18 and the shield plane 12 seen from the communication-power feed plane 15 side is $Z_m^2/Z_s$. This impedance $Z_m^2/Z_s$ matches with the sheet impedance $Z_t$ of the communication-power feed plane 15 by the formula (4). With the matched line part 18 having this type of x-direction width and impedance, electromagnetic wave leakage is suppressed even where the matched line part 18 is a narrow region, which is ¼ of the effective wavelength λ. By increasing the region of the communication-power feed plane 15, a large amount of electric power is allowed to be supplied.

In particular, in a case where a frequency or a wavelength at which electromagnetic wave leakage becomes a problem is already known (for example, in the case of transmitting a large amount of electric power), the communication medium 2 suppresses electromagnetic wave leakage, and realizes efficient communication and supply of electric power. Moreover, as with the first exemplary embodiment, the characteristic of the matched line part 18 (for example, Chebyshev taper) can be quantitatively defined based on the formula (I) that defines the relationship between reflection coefficient and sheet impedance based on the relationship between the respective variables such as conductor width and grid interval, and the sheet impedance.

As a result, according to the communication medium 2 of the present exemplary embodiment, electromagnetic wave leakage from the end part is suppressed even when electromagnetic waves are supplied. Therefore, even in the case of transmitting a large amount of electric power, or in the case where a coupler is installed at the end part of the communication medium 2 or on the communication-power feed plane 15, electromagnetic wave leakage from the periphery of the coupler is suppressed. As a result, it is possible to realize safe and highly reliable communication or electric power transmission.

While the invention has been particularly shown and described with reference to exemplary embodiments thereof, the invention is not limited to these embodiments. Various modifications that can be understood by one skilled in the art may be made to the configuration or the details of the present invention, without departing from the scope of the invention.

This application is based upon and claims the benefit of priority from Japanese patent application No. 2010-258727, filed Nov. 19, 2010, the disclosure of which is incorporated herein in its entirety by reference.

INDUSTRIAL APPLICABILITY

The present invention can be applied to a communication medium. According to this communication medium, electromagnetic wave leakage can be suppressed.

REFERENCE SYMBOLS 1,2 Communication medium
11 First conductor sheet
12 Shield plane
13 Metal wall
14 Variable mesh part
15 Communication-power feed plane
16 Second conductor sheet
17 Dielectric
18 Matched line part

The invention claimed is:

1. A communication medium comprising:
    a first sheet conductor portion;
    a second sheet conductor portion that is arranged facing the first sheet conductor portion; and
    a conductor portion that surrounds an end part of the first sheet conductor portion and an end part of the second sheet conductor portion,
    the second sheet conductor portion comprising:
    a shield part that has no opening part;
    a communication power feed part that has opening parts; and
    a matched line part that is provided between the shield part and the communication power feed part, and a sheet impedance of the matched line part matches with the shield part and the communication power feed part,
    the conductor portion surrounding the end part of the shield part, and
    the sheet impedance of the matched line part being defined so that a reflection coefficient becomes zero.

2. The communication medium according to claim 1, wherein the matched line part is a ¼ wavelength line.

3. The communication medium according to claim 1, wherein the reflection coefficient is Γ, wherein Γ is:

$$\Gamma = \frac{1}{2} \int_0^L e^{-2j\beta x} \frac{d}{dx}(\ln Z(x)) dx = 0, \quad (1)$$

where β is a phase constant, L is a width of the variable mesh part, and Z is the sheet impedance.

* * * * *